United States Patent

Suzuki et al.

[11] Patent Number: 5,296,294
[45] Date of Patent: Mar. 22, 1994

[54] GLASS PANEL RESISTANT TO COLORING WHEN IRRADIATED WITH ELECTRON RAYS

[75] Inventors: Kouichi Suzuki, Nishinomiya; Kazuo Shibaoka, Itami, both of Japan

[73] Assignee: Nippon Sheet Glass Co., Ltd., Osaka, Japan

[21] Appl. No.: 989,826

[22] Filed: Dec. 14, 1992

[51] Int. Cl.$^5$ .............................................. B32B 17/06
[52] U.S. Cl. .................................... 428/410; 428/409; 428/426; 501/53; 501/55; 501/68; 501/69; 501/70
[58] Field of Search ............... 428/410, 409, 426; 501/53, 55, 68, 69, 70

[56] References Cited

U.S. PATENT DOCUMENTS

| | | | |
|---|---|---|---|
| 4,212,919 | 7/1980 | Hoda | 428/410 |
| 4,273,832 | 6/1981 | Hogan | 428/410 |
| 4,671,814 | 6/1987 | Aratani | 428/410 |
| 4,897,371 | 1/1990 | Suzuki et al. | 501/70 |

Primary Examiner—Ellis P. Robinson
Assistant Examiner—Timothy M. Speer
Attorney, Agent, or Firm—Wenderoth, Lind & Ponack

[57] ABSTRACT

A glass panel resistant to coloring when irradiated with electron rays, which has the following glass composition:

| | |
|---|---|
| $SiO_2$ | 64–75% by weight |
| $Al_2O_3$ | 1.5–2.0% by weight |
| CaO | 6.5–9.0% by weight |
| MgO | 0–5.0% by weight |
| $Li_2O$ | 0.5–2.5% by weight |
| $Na_2O$ | 7.0–12% by weight |
| $K_2O$ | 2.1–5.0% by weight |
| $SrO + BaO + ZrO_2$ | 0–10% by weight |
| $CeO_2$ | 0–0.5% by weight, | wherein part of the Na ion, in at least the surface layer of the panel region to be irradiated with electron rays, is substituted with K ion by an ion exchange treatment in a K-containing molten salt so that the molar ratio of Na ion and K ion expressed by $Na_2O/(Na_2O+K_2O)$ in at least the glass layer ranging from 0.5 μm to 6.5 μm in depth from the panel surface, of said panel region to be irradiated with electron rays, is 0.3–0.75.

18 Claims, 4 Drawing Sheets

Depth of coloring region

Transmittance was measured after the glass was etched from the coloring side step by step.

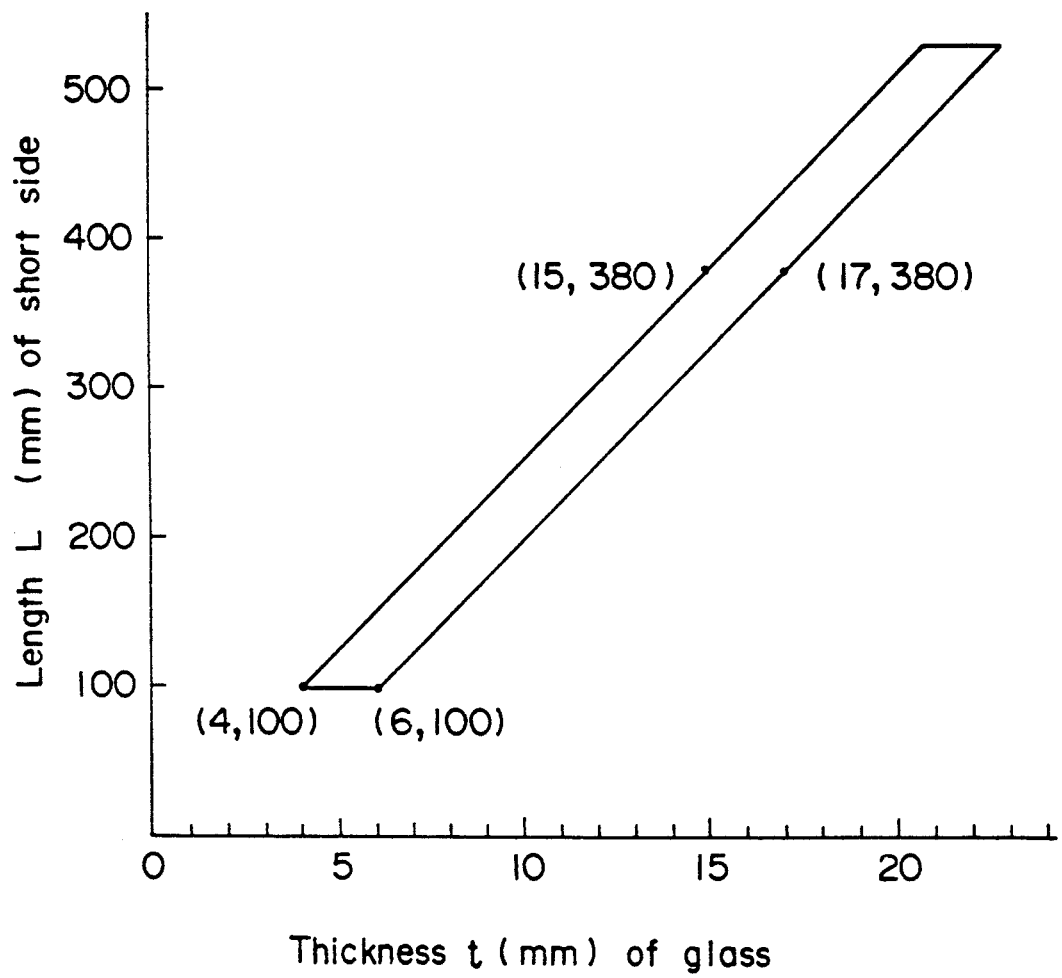

GLASS PANEL RESISTANT TO COLORING WHEN IRRADIATED WITH ELECTRON RAYS

BACKGROUND OF THE INVENTION

1. Field of the Invention

The present invention relates to a glass panel used in image display devices (e.g. a cathode ray tube, plasma display panel) or fluorescent indicator tubes which are irradiated with electron rays, particularly to a glass panel suitably used in cathode ray tubes which are irradiated with electron rays of high energy density.

2. Description of Related Art

Currently, display devices using a cathode ray tube or a plasma display are required to use electron rays of high acceleration voltage or high energy density in order to increase the luminance, or to decrease the thickness, of the glass panel in order to reduce the total weight.

Hence, the glass panels used in said display devices are required to (a) undergo low coloring when irradiated with electron rays, (b) have a high strength even when the panels are thin and (c) be resistant to dielectric breakdown even when a high voltage is applied thereto. Further, it is necessary that the glass ingredients be sufficiently available in order to enable production, of glass panels meeting the above requirements in a large amount. For these reasons, studies have been under way on various glass compositions containing no PbO (PbO increases the weight of resulting glass). That is, it is under study to heat-form a glass plate material containing no PbO, then substitute the Na ion present at the plate surface with K ion to generate a compression layer at the plate surface and to thereby produce a glass panel having a higher mechanical strength while incurring low coloring when irradiated with electron rays. In such a glass panel, the glass composition, particularly the $Na_2O$, $K_2O$ and $Li_2O$ contents and the viscosity characteristic of glass plate material are important. Japanese Patent Application Kokai (Laid-open) No. 288134/1987 discloses a glass panel containing SrO and BaO and having a controlled ratio of $Na_2O$ and $K_2O$ contents. This glass panel has a high $K_2O$ content and therefore has a good electrical insulating property; however, even after being subjected to an ion exchange treatment (for substitution of Na ion in panel with K ion) in a molten salt containing K ion, the panel is unable to have a higher mechanical strength and shows insufficient suppression for coloring caused by irradiation with electron rays. Further, the glass plate material used for the production of the above glass panel cannot be produced by shaping a molten glass material directly into a flat plate according to the float process, and must be produced by subjecting a glass gob to press molding, followed by surface grinding.

Meanwhile, Japanese Patent Application Kokai (Laid-open) No. 153143/1987 discloses a glass plate material which can be produced as a flat plate directly by the float process. The glass panel produced therefrom has a high electrical insulating property but, even after being subjected to an ion exchange treatment, is unable to show improvements in resistance to coloring caused by irradiation with electron rays as well as in mechanical strength.

Further, Japanese Patent Application Kokai (Laid-open) No. 195146/1988 discloses a glass panel which is produced by subjecting a glass plate material of soda-lime silica composition for commercially available window glass, obtained by the float process, to an ion exchange treatment in a K-containing molten salt to form a K-ion-rich layer at the panel surface and which resultantly has sufficient resistance to coloring when irradiated with electron rays and sufficient mechanical strength. The glass panel, however, has a low electrical insulating property and, when receiving a high voltage locally, gives rise to dielectric breakdown.

The present invention has been made in order to solve the above-mentioned problems of the prior art. The object of the present invention is to provide a glass panel characterized by (a) a suppression of the coloring caused by electron rays irradiation, (b) a high mechanical strength owing to the presence of a compression stress layer formed at the panel surface by an ion exchange treatment, and (c) a high electrical insulating property and therefore being resistant to dielectric breakdown even when a high voltage is applied to the panel, and further characterized in that the glass plate material used for production of said glass panel can be produced directly from a molten glass material by the float process.

SUMMARY OF THE INVENTION

The present invention provides a glass panel resistant to coloring when irradiated with electron rays, which has the following glass composition:

| | |
|---|---|
| $SiO_2$ | 64–75% by weight |
| $Al_2O_3$ | 1.5–2.0% by weight |
| CaO | 6.5–9.0% by weight |
| MgO | 0–5.0% by weight |
| $Li_2O$ | 0.5–2.5% by weight |
| $Na_2O$ | 7.0–12% by weight |
| $K_2O$ | 2.1–5.0% by weight |
| $SrO + BaO + ZrO_2$ | 0–10% by weight |
| $CeO_2$ | 0–0.5% by weight | and wherein part of the Na ion in at least the surface layer of the panel region to be irradiated with electron rays, is substituted with K ion by an ion exchange treatment in a K-containing molten salt and resultantly the molar ratio of Na ion and K ion expressed by $Na_2O/(Na_2O+K_2O)$ in at least the glass layer ranging from 0.5 $\mu m$ to 6.5 $\mu m$ in depth from the panel surface, of said panel region to be irradiated with electron rays is 0.3–0.75.

BRIEF DESCRIPTION OF THE DRAWINGS

FIG. 6 is a graph showing the preferred ranges of the thickness (t) of top plane and the short side ($L_1$) of top plane, of the glass panel of the present invention used as the flat plate of cathode ray tube of flat surface television.

DETAILED DESCRIPTION OF THE INVENTION

Figure 1:
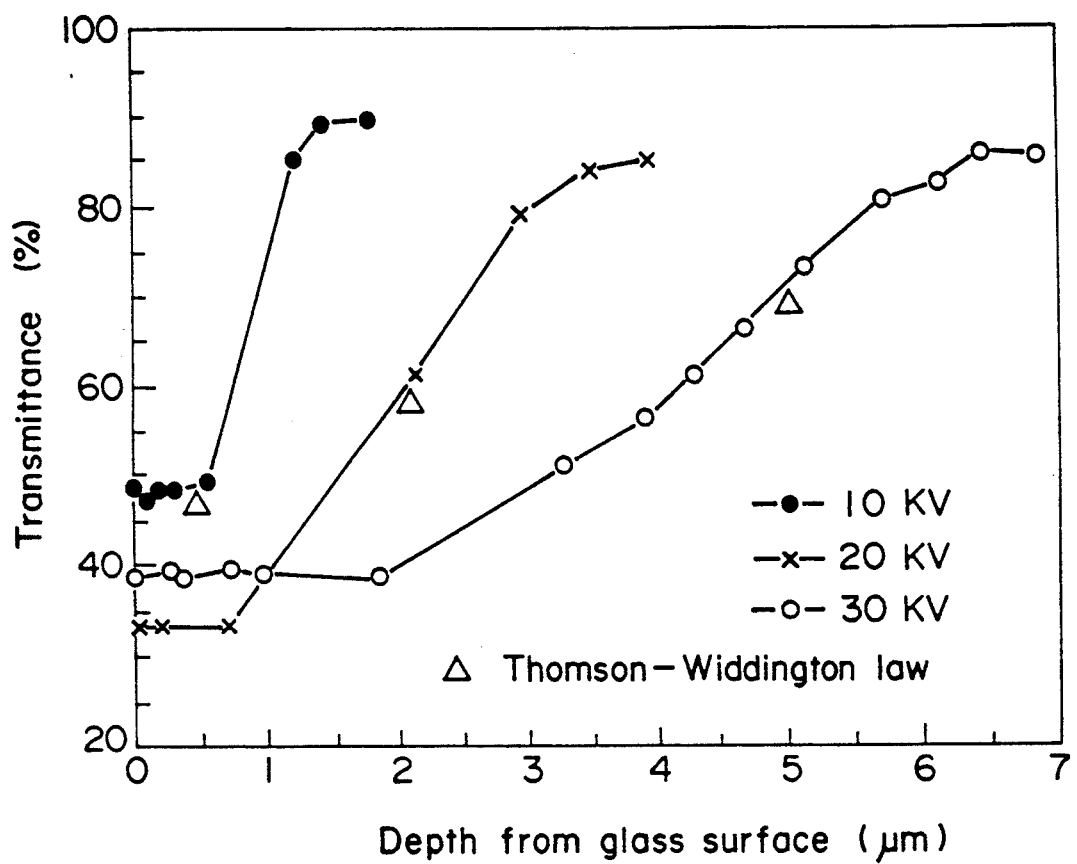
FIG. 1 is a graph showing the depth of each colored layer formed at the surface of a glass plate having the glass composition of the present invention, when the glass plate is irradiated with electron rays accelerated by various voltages.

The present invention is hereinafter described in detail. In the following description, % refers to % by weight unless otherwise specified.

In the present invention, the glass composition is as follows.

| | |
|---|---|
| $SiO_2$ | 64–75% by weight |
| $Al_2O_3$ | 1.5–2.0% by weight |
| CaO | 6.5–9.0% by weight |
| MgO | 0–5.0% by weight |
| $Li_2O$ | 0.5–2.5% by weight |
| $Na_2O$ | 7.0–12% by weight |
| $K_2O$ | 2.1–5.0% by weight |
| $SrO + BaO + ZrO_2$ | 0–10% by weight |
| $CeO_2$ | 0–0.5% by weight |

The glass composition is preferably as follows.

| | |
|---|---|
| $SiO_2$ | 64–72% by weight |
| $Al_2O_3$ | 1.5–2.0% by weight |
| CaO | 6.5–9.0% by weight |
| MgO | 3.0–4.0% by weight |
| $Li_2O$ | 0.5–1.5% by weight |
| $Na_2O$ | 8.5–10.5% by weight |
| $K_2O$ | 2.1–3.0% by weight |
| $SrO + BaO + ZrO_2$ | 4.5–10.0% by weight |

The above glass composition has been selected so as to satisfy the following requirements.

(1) The contents of alkali metal oxides, i.e. $Na_2O$, $K_2O$ and $Li_2O$ are selected so that (a) the ion-exchange layer formed by ion exchange between Na ion in glass and K-ion-containing molten salt can effectively prevent coloring when the glass panel of the present invention is irradiated with electron rays, (b) the ion-exchanged layer gives a high compression stress (e.g., 40 kg/mm$^2$ or more), and (c) said ion-exchange layer is formed in a depth range from 1 μm to 6 μm measured from the panel surface (that is, the layer has a thickness of 5 μm), in an ion exchange treatment time shorter than 180 minutes.

(2) The overall glass composition is selected so that it has a viscosity-temperature characteristic similar to that of the soda-lime-silica glass for window use, in order to enable shaping into a plate by the float process. That is, when the viscosity η (unit: poise) of glass is expressed as log η, log η is determined to be 9.5–11 at 600° C., 5.0–6.5 at 800° C., 3.5–4.5 at 1,000° C., 2.5–3.0 at 1,200° C. and 1.5–2.5 at 1,400° C.

(3) The electrical resistivity of glass must be at least $1 \times 10^{10}$ Ωcm in order for the glass to give rise to no dielectric breakdown even when electron rays and a high voltage are applied to the glass.

When the content of $Na_2O$ is lower than 7%, the layer generated in the vicinity of the glass surface by a Na ion-K ion exchange treatment has a low compression stress and the resulting glass panel has no high strength; moreover, the glass has too high a viscosity and, in producing a glass plate therefrom, the melting and shaping are difficult. When the content of $Na_2O$ is higher than 12%, the resulting glass panel undergoes remarkable coloring when irradiated with electron rays. A preferable content of $Na_2O$ is in the range of 8.5–10.5%.

When the content of $K_2O$ is lower than 2.1%, the resulting glass panel undergoes remarkable coloring when irradiated with electron rays, has a low electrical resistance, and tends to give dielectric breakdown when a high voltage is applied thereto locally. When the content of $K_2O$ is higher than 5%, the layer generated at the surface of untreated glass panel by an ion exchange treatment has a low compression stress and the resulting glass panel has no high strength; moreover, the glass has too high a viscosity and, in producing a glass plate therefrom, the melting and shaping are difficult. A preferable content of $K_2O$ is in the range of 2.1–3.0% and a more preferable content is in the range of 2.5–3.0%.

Addition of $Li_2O$ to the $Na_2O$ and $K_2O$ contained in the above ranges can further suppress the coloring of the resulting glass panel when the panel is irradiated with electron rays, and can allow the glass panel to have an electrical resistivity of $1 \times 10^{10}$ Ωcm or more. When the content of $Li_2O$ is lower than 0.5%, the resulting glass panel has a small effect on the suppression of coloring caused by electron rays. When the content is higher than 2.5%, the glass has a low viscosity at a low temperature range (500°–800° C.), which is not preferable for production of a glass plate. A preferable content of $Li_2O$ is in the range of 0.5–1.5%.

$SiO_2$ is a major component for glass formation. When the content of $SiO_2$ is lower than 64%, the resulting glass has too low a viscosity. When the content is higher than 75%, the glass has too high a viscosity and the melting and shaping are difficult for production of a glass plate therefrom. A preferable content of $SiO_2$ is in the range of 64–72%.

When the content of $Al_2O_3$ is lower than 1.5%, the resulting glass has poor chemical durability. When the content is higher than 2%, the glass has a high viscosity and is difficult to melt for production of a glass plate therefrom.

When the content of CaO is lower than 6.5%, the resulting glass has a low electrical resistance and, when a high voltage is applied thereto, tends to give rise to dielectric breakdown; further, the glass has a high viscosity at high temperatures and is difficult to melt. When the content of CaO is higher than 9%, the glass has a high viscosity at a lower temperature range (500°–800° C.) and too low a viscosity at a high temperature range (800°–1,500° C.); this causes, when a glass plate is produced from the glass on a molten tin bath by the float process, a variation in panel thickness owing to the temperature distribution of said bath.

MgO is used together with CaO. When the content of MgO is higher than 5%, the resulting glass has a high viscosity at a high temperature range (800°–1,500° C.) and is difficult to melt for production of a glass plate therefrom. A preferable range of MgO is in the range of 3.0–4.0%.

When the glass panel of the present invention is irradiated with electron rays at a high acceleration voltage, the present glass panel may contain $SrO_2$, BaO, $ZrO_2$, etc. in a total amount not exceeding 10% in order for the generated X-rays not to leak to outside; and the glass panel may further contain $CeO_2$ and $TiO_2$ each in amount not exceeding 0.5% in order to suppress the coloring of the panel by said X-rays. In addition, $Fe_2O_3$, etc. may be contained in the glass panel, as impurities of material glass. It is possible to add coloring components such as NiO, CoO, $Cr_2O_3$, $Nd_2O_3$, $MnO_2$ and the like, for tinting of the glass panel. A preferred content of ($SrO+BaO+ZrO_2$) is in the range of 4.5–10.0%. When SrO, Bao and $ZrO_2$ are contained in a glass in a total amount of 4.5% or more, the glass can have an increased electrical resistivity of $1 \times 10^{10.7}$ cm or more at 150° C., whereby the glass panel for cathode ray tube produced therefrom has a very low risk of giving dielectric breakdown even when a high voltage is applied thereto. With respect to the use of SrO, Bao and $ZrO_2$, single use of BaO is most preferable.

In the glass panel of the present invention, part of the Na ion, in at least the surface layer of the panel region to be irradiated with electron rays, is substituted with K ion by an ion exchange treatment in a K-containing molten salt and, resultantly, the molar ratio of Na ion and K ion expressed by $Na_2O/(Na_2O+K_2O)$ in at least the glass layer ranging from 0.5 μm to 6.5 μm in depth from the panel surface of said panel region to be irradiated with electron rays is 0.3–0.75. In the present invention, by maintaining the molar ratio of Na ion and K ion in said glass surface layer, in the above range, the glass panel has a high strength and further is effectively protected from coloring caused by irradiation with electron rays. Incidentally, the molar ratio of Na ion and K ion at a desired depth range measured from the panel surface can be measured by an X-ray analyzer.

FIG. 1 shows the depths of colored layers formed in a glass plate having the glass composition of the present invention but subjected to no ion exchange treatment, when the surface of said glass plate was irradiated with electron rays accelerated by various voltages. In FIG. 1, the ordinate indicates the light transmittance measured after the glass plate irradiated with electron rays was etched from the irradiated surface little by little. As appreciated from FIG. 1, when the glass panel was irradiated with electron rays accelerated by a voltage of 10 KV, there was formed a colored layer having a depth range of 0.5–1.5 μm (the depth is a distance from the panel surface); that is, the electrons penetrated as far as the above depth range. Similarly, when the glass plate was irradiated with the electron rays accelerated by a voltage of 20 KV or 30 KV, there was formed a colored layer having a depth range of 1–3.5 μm or 2–6.5 μm. In the glass panel of the present invention, the coloring caused by irradiation with electron rays is effectively prevented by maintaining the molar ratio of $Na_2O$ and $K_2O$ present in the surface layer corresponding to the above colored layer, in a desired range as mentioned above. Further by substituting the Na ion present in said surface layer, with K ion of larger ionic radius, a compression layer is formed at the glass surface and, as a result, the resulting glass panel has an increased mechanical strength.

Thus, when the glass panel is used in applications where the panel is irradiated with electron rays accelerated by a voltage of 10 KV, it is preferable that the $Na_2O/(Na_2O+K_2O)$ in the depth range of the panel measured from the panel surface, of 0.5–1.5 μm be 0.3–0.75. In this case, the panel thickness is preferably 4–7 mm. When the glass panel is irradiated with electron rays accelerated by a voltage of 20 KV or 30 KV, it is preferable that the $Na_2O/(Na_2O+K_2O)$ in the depth range of the panel measured from the panel surface, of 1.5–3.5 μm or 1.5–6.5 μm be 0.3–0.75. In this case, the panel thickness is preferably 14–18 mm or 19–23 mm.

When the glass panel is subjected to an ion exchange treatment in a K-containing molten salt, the whole areas of the both sides (front and back sides) of the panel are subjected to the ion exchange treatment. As necessary, however, only one side of the glass panel or only the desired region of one side may be subjected to an ion exchange treatment. Such partial ion exchange can be conducted by, for example, covering the region requiring no ion exchange treatment, with a shielding layer which prevents ion exchange.

According to our study, when the value of $Na_2O/(Na_2O+K_2O)$ in the desired depth range of the glass panel measured from the panel surface is smaller than 0.3 or larger than 0.75, irradiation of the glass panel with electron rays tends to cause movement of alkali components such as $Na_2O$ and $K_2O$ in the glass, making it difficult to suppress the coloring brought about by irradiation with electron rays; further, the glass panel has a low light transmittance, making it difficult to efficiently take a transmitted light out of the panel.

In the glass panel of the present invention, the ion exchange treatment is conducted preferably by processing a glass plate material to a desired shape and then dipping the resulting glass panel in a K-ion-containing molten salt of 450°–510° C. to substitute part of the Na ion present at the surface of the glass panel, with K ion by ion exchange. When the temperature of the ion exchange treatment is lower than 430° C., the time required for the treatment is long; when the temperature is higher than 510° C., the surface compression stress generated by the ion exchange treatment is relaxed (low) and it is impossible to obtain a high strength.

When the cations of the molten salt consist of Na ion and K ion, the molar ratio of the Na ion and the K ion ($Na^+/K^+$) is preferably in the range of 0.25 to 0.75. When the molar ratio is outside the above range, it is impossible that the molar ratio of $Na_2O$ and $K_2O$ expressed by $Na_2O/(Na_2O+K_2O)$ in the surface layer of the glass panel be allowed to fall in the range of 0.3 to 0.75, by the ion exchange treatment.

The ion exchange treatment is conducted in the above temperature range by appropriately selecting the temperature and the time. The preferable contact time between the untreated glass panel and the molten salt is generally 30–420 minutes. When the contact time is shorter than 30 minutes, no sufficient exchange takes place between Na ion and K ion; when the contact time is longer than 420 minutes, it is difficult to provide the surface layer of the glass panel with a molar ratio expressed by $Na_2O/(Na_2O+K_2O)$, of 0.3 to 0.75.

When there is used a molten salt whose cation consists of K ion alone, it is possible to form a K ion layer at the surface of the glass panel; then, the K ion and Na ion in the panel are subjected to mutual diffusion by, for example, heating in the air, whereby the above surface layer can have a molar ratio expressed by $Na_2O/(Na_2O+K_2O)$, of 0.3 to 0.75.

Figure 2:
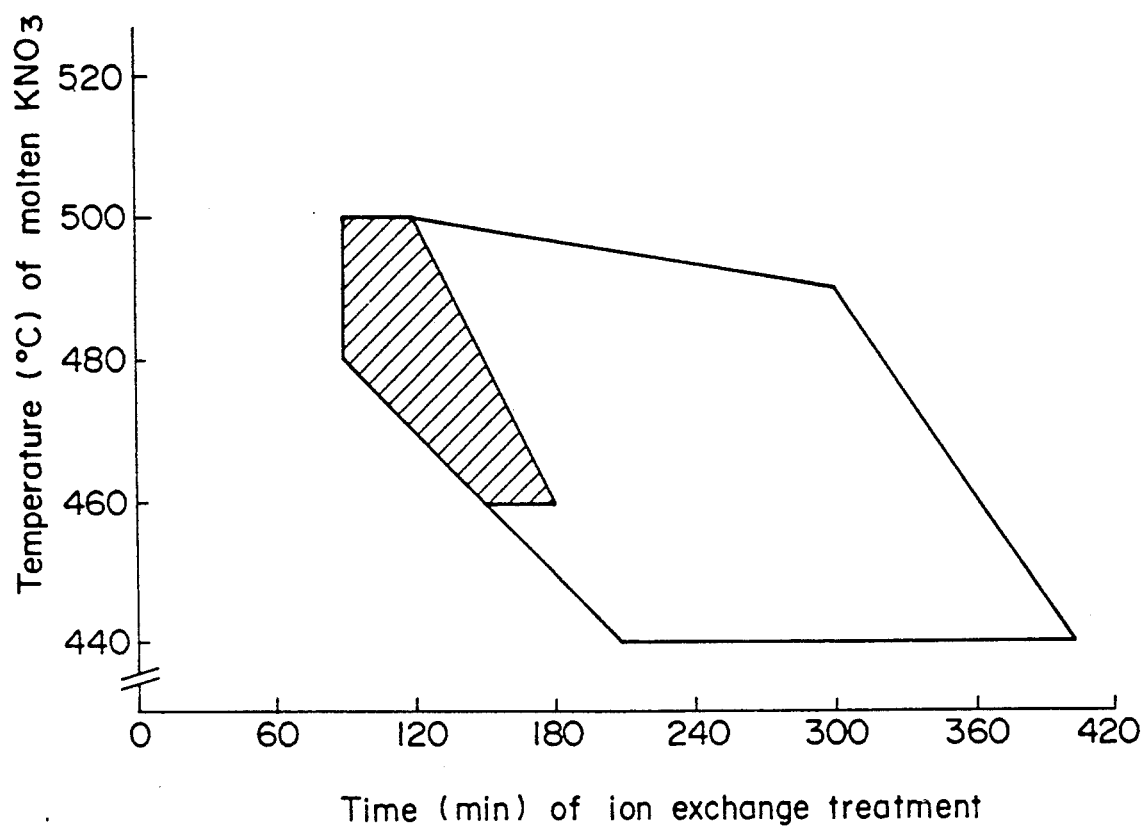
FIG. 2 is a graph showing the preferred ranges of the temperature and time employed for ion exchange treatment of glass panel.

The temperature and time of the ion exchange treatment are selected more preferably from the region shown in FIG. 2, in order to effectively suppress the coloring of the resulting glass panel caused by irradiation with electron rays and maximize the mechanical strength of the panel. In the regions above or at the right of the region surrounded by a solid line, the compression stress once generated in the surface layer during the ion exchange treatment step is relaxed and consequently the resulting glass panel fails to have a high mechanical strength and, moreover, the surface layer is virtually unable to have a molar ratio expressed by $Na_2O/(Na_2O+K_2O)$, of 0.3 to 0.75. In the regions below or at the left of the region surrounded by the solid line, no sufficient ion exchange takes place and the resulting compression stress is insufficient, making it impossible to obtain a high mechanical strength. It is preferable to select the temperature and time of ion exchange treatment so as to fall in the hatched region of FIG. 2, in order to conduct the ion exchange treatment in the shortest time and yet achieve the prevention of coloring by electron rays and the improvement in mechanical strength.

The glass panel of the present invention is used in production of image display devices or fluorescent indicator tubes irradiated with electron rays, such as cathode ray tubes and plasma display panels.

Figure 3:
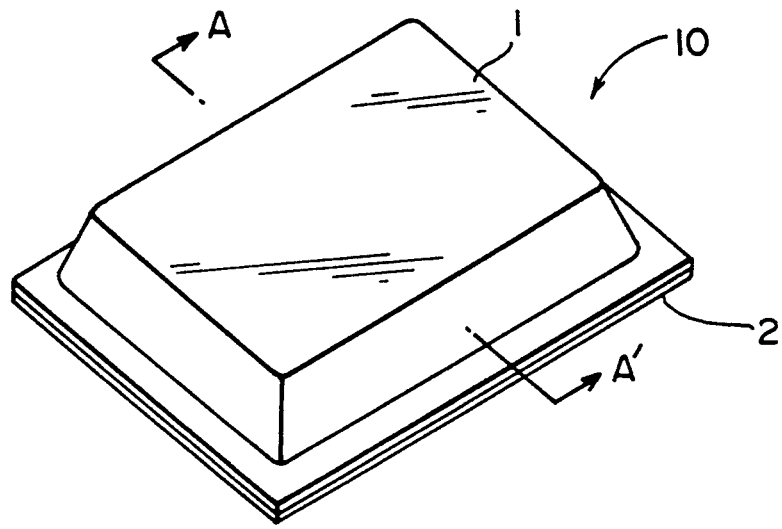
FIG. 3 is a perspective view showing an example of the cathode ray tube used in flat surface televisions.
Figure 4:
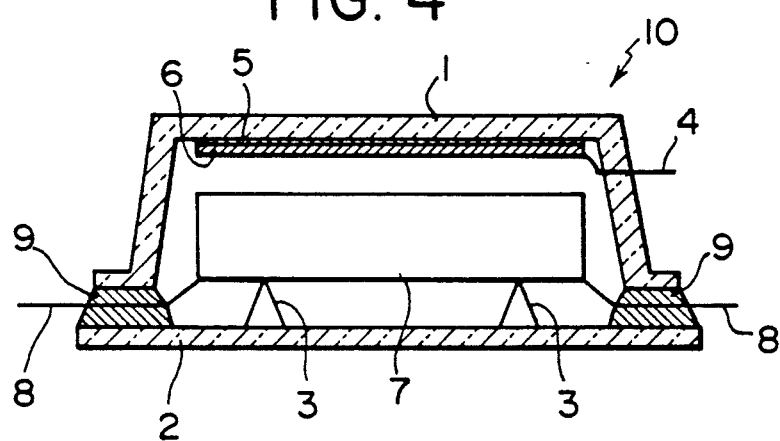
FIG. 4 is a sectional view taken at the A—A' line of FIG. 3.

FIGS. 3 and 4 show an example 10 of the cathode ray tube used in flat surface televisions. In FIGS. 3 and 4, 1 is a glass-made face plate of brimmed thin tray shape. The glass panel of the present invention is used as such a face plate. The face plate 1 is tightly vacuum adhered to a glass back plate 2 with a low-melting frit 9. On the inner side of the face plate 1 is formed a fluorescent film 5, and a metallic thin film 6 is formed thereon. 3 is a stud pin; 4 is an anode; 7 is an electron gun unit; and 8 is signal-introducing line.

Figure 5:
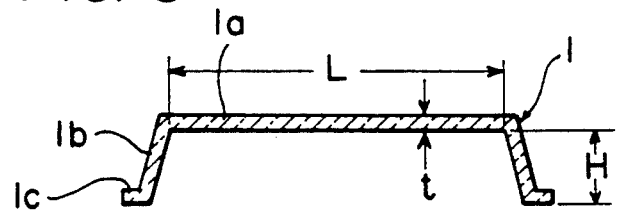
FIG. 5 is a sectional view showing an example of the shape of the glass panel of the present invention used as the flat plate of cathode ray tube of flat surface television.

As shown in FIG. 5, the face plate 1 consists of a top portion $1a$ of rectangular shape, a side $1b$ and a brim $1c$. The thickness t (mm) of the top portion, the length $L_1$ (mm) of the short side of the top portion, the length $L_2$ (mm) of the long side of the top portion and the depth H (mm) are preferably selected so as to satisfy the following relationships.

$L_1 = 100-530$ $L_2 = (1.3-3)L_1$ $H = 20-40$ $25.45t - 1.8 > L_1 > 25.45t - 52.7$

The relationship between the thickness t and the length $L_1$ of the short side is in the range surrounded by the parallelogram shown in FIG. 6.

In shaping a glass plate material into a glass panel of the present invention, there can be used a known method, for example, a method disclosed in Japanese Patent Application Kokai (Laid-open) No. 122932/1989 which comprises mounting a glass plate material on a male die and heating the plate so that the peripheral portion be heated to a higher temperature, to obtain a glass panel of desired shape.

In the glass panel of the present invention, the contents of $Na_2O$, $K_2O$ and $Li_2O$ are controlled so that the panel has a high electrical insulating property, whereby the glass panel is resistant to dielectric breakdown even when the panel is irradiated with electron rays and receives a high voltage. Further in the present glass panel, there is formed, at least at the glass surface region corresponding to the panel region to be irradiated with electron rays, a surface layer which has a compression stress and wherein the contents of $Na_2O$ and $K_2O$ are controlled, whereby the glass panel is resistant to coloring even when irradiated with electron rays and has a high mechanical strength.

Thus, in the glass panel of the present invention, the reduction ($\Delta T$) in transmittance of the panel after irradiation with electron rays as compared with before irradiation is smaller than 40%, preferably smaller than 20% when the panel is irradiated with electron rays of 10 KV and 40 $\mu A/cm^2$ for 100 hours in vacuum and the transmittance after and before irradiation are measured using a light of 400 nm wavelength.

EXAMPLES

Example 1

A glass having a composition shown in the sample 1 column of Table 1 was melted in a platinum crucible. The molten glass was casted onto a metal plate and cooled. The cooled glass was ground to obtain a glass plate of 5 mm in thickness. The glass plate was mounted on a male die and placed in an electric furnace, wherein the plate was heated so that the peripheral portion became hotter, to prepare a glass panel as shown in FIG. 5, whose image display area had a rectangular shape of 15 cm in diagonal. The glass panel was subjected to an ion exchange treatment at 460° C. for 180 minutes in molten potassium nitrate and then subjected to a hot treatment at 450° C. for 3 hours. The thus treated glass panel was measured for logarith of volume resistivity (log $\rho$), reduction ($\Delta T$) in transmittance after irradiation with electron rays ($\Delta T$ = transmittance before irradiation minus transmittance after irradiation), and compression stress of surface layer. The results are shown in Table 3.

The volume resistivity was measured at 150° C. The reduction ($\Delta T$) in transmittance after irradiation with electron rays is a transmittance of glass panel before irradiation with electron rays minus a transmittance of the glass panel after irradiation with electron rays of 10 KV and 40 $\mu A/cm^2$ for 100 hours in vacuum (the transmittance was measured using a light of wavelength of 400 nm). The surface compression stress was measured using a polarizing microscope.

Samples 2-13 were prepared in the same manner as sample 1 except that there were used glasses having compositions shown in the columns of samples 2-13 of Table 1 and that there were used the conditions for ion exchange treatment shown in Table 3. The samples 2-13 were measured for the same items as above. The results are shown in Table 3.

COMPARATIVE EXAMPLES

Glass panels having the glass compositions shown in Table 2 disclosed in the prior art were produced and subjected to ion exchange under the ion exchange conditions shown in Table 4. The resulting comparative samples were measured for logarith of volume resistivity (log $\rho$), reduction ($\Delta T$) in transmittance after irradiation with electron rays ($\Delta T$ = transmittance before irradiation minus transmittance after irradiation), and compression stress of the surface layer obtained by the ion exchange treatment. The results are shown in Table 4.

TABLE 1

| | Glass composition (weight %) | | | | | | | | | | | | | | | |
|---|---|---|---|---|---|---|---|---|---|---|---|---|---|---|---|---|
| | $SiO_2$ | $Al_2O_3$ | $Li_2O$ | $Na_2O$ | $K_2O$ | SrO | BaO | ZnO | MgO | CaO | $Fe_2O_3$ | $ZrO_2$ | $TiO_2$ | $CeO_2$ | $Sb_2O_3$ | $As_2O_3$ |
| Sample 1 | 72.8 | 1.7 | 0.7 | 10.6 | 2.8 | 0.0 | 0.0 | — | 3.8 | 7.5 | 0.08 | — | — | — | — | — |
| Sample 2 | 71.9 | 1.7 | 0.7 | 10.6 | 2.8 | 0.0 | 0.0 | — | 3.8 | 8.5 | 0.08 | — | — | — | — | — |
| Sample 3 | 72.3 | 1.7 | 0.7 | 9.1 | 4.9 | 0.0 | 0.0 | — | 3.8 | 7.5 | 0.08 | — | — | — | — | — |
| Sample 4 | 68.7 | 1.6 | 0.6 | 10.3 | 2.7 | 0.0 | 5.0 | — | 3.7 | 7.3 | 0.08 | — | — | — | — | — |

TABLE 1-continued

| | Glass composition (weight %) | | | | | | | | | | | | | | | |
|---|---|---|---|---|---|---|---|---|---|---|---|---|---|---|---|---|
| | $SiO_2$ | $Al_2O_3$ | $Li_2O$ | $Na_2O$ | $K_2O$ | SrO | BaO | ZnO | MgO | CaO | $Fe_2O_3$ | $ZrO_2$ | $TiO_2$ | $CeO_2$ | $Sb_2O_3$ | $As_2O_3$ |
| Sample 5 | 69.7 | 1.6 | 0.5 | 8.7 | 2.3 | 0.0 | 5.0 | — | 3.7 | 8.2 | 0.08 | — | — | — | — | — |
| Sample 6 | 64.7 | 1.6 | 0.6 | 10.0 | 2.6 | 0.0 | 9.7 | — | 3.6 | 7.1 | 0.08 | — | — | — | — | — |
| Sample 7 | 66.3 | 1.6 | 0.5 | 8.1 | 2.1 | 0.0 | 9.7 | — | 3.6 | 8.0 | 0.08 | — | — | — | — | — |
| Sample 8 | 73.3 | 1.7 | 1.3 | 9.3 | 2.8 | 0.0 | 0.0 | — | 3.9 | 7.6 | 0.08 | — | — | — | — | — |
| Sample 9 | 72.8 | 1.7 | 1.3 | 7.8 | 4.9 | 0.0 | 0.0 | — | 3.8 | 7.5 | 0.08 | — | — | — | — | — |
| Sample 10 | 69.1 | 1.7 | 1.3 | 9.0 | 2.7 | 0.0 | 5.0 | — | 3.7 | 7.3 | 0.08 | — | — | — | — | — |
| Sample 11 | 70.2 | 1.7 | 1.1 | 7.6 | 2.3 | 0.0 | 5.0 | — | 3.7 | 8.3 | 0.08 | — | — | — | — | — |
| Sample 12 | 65.2 | 1.6 | 1.3 | 8.7 | 2.7 | 0.0 | 9.8 | — | 3.6 | 7.1 | 0.08 | — | — | — | — | — |
| Sample 13 | 66.9 | 1.6 | 1.0 | 7.0 | 2.1 | 0.0 | 9.8 | — | 3.6 | 8.0 | 0.08 | — | — | — | — | — |

TABLE 2

| | Glass composition (weight %) | | | | | | | | | | | | | | | |
|---|---|---|---|---|---|---|---|---|---|---|---|---|---|---|---|---|
| | $SiO_2$ | $Al_2O_3$ | $Li_2O$ | $Na_2O$ | $K_2O$ | SrO | BaO | ZnO | MgO | CaO | $Fe_2O_3$ | $ZrO_2$ | $TiO_2$ | $CeO_2$ | $Sb_2O_3$ | $As_2O_3$ |
| Comparative Example 1 | 61.5 | 2.0 | 1.5 | 3.7 | 9.9 | 9.8 | 8.5 | 0.5 | — | — | — | 1.2 | 0.5 | 0.5 | 0.4 | — |
| Comparative Example 2 | 61.4 | 2.0 | 0.8 | 4.0 | 8.0 | 8.8 | 8.8 | 0.5 | 0.5 | 1.5 | — | 2.5 | 0.5 | 0.5 | 0.2 | — |
| Comparative Example 3 | 70.1 | 3.0 | 2.0 | 5.0 | 7.4 | — | — | — | 4.0 | 8.0 | — | — | — | 0.5 | — | 0.2 |
| Comparative Example 4 | 61.0 | 3.0 | — | 7.0 | 6.5 | 3.0 | 7.0 | — | 4.0 | 8.0 | — | — | — | — | — | — |
| Comparative Example 5 | 71.3 | 1.4 | 1.0 | 12.3 | 0.8 | — | — | — | 3.9 | 8.9 | 0.08 | — | 0.0 | — | — | — |

TABLE 3

| | Volume resistivity log $\rho$ ($\Omega$cm) | Resistance to coloring by electron rays $\Delta T$ (%) | Mechanical strength $Kg/mm^2$ | Ion exchange treatment Temp. (°C.) | Time (min) |
|---|---|---|---|---|---|
| Sample 1 | 10.00 | 33 | 59 | 460 | 180 |
| Sample 2 | 10.25 | 30 | 62 | 460 | 180 |
| Sample 3 | 10.65 | 35 | 56 | 460 | 180 |
| Sample 4 | 10.70 | 19 | 50 | 490 | 300 |
| Sample 5 | 10.85 | 17 | 52 | 460 | 180 |
| Sample 6 | 11.40 | 14 | 47 | 490 | 300 |
| Sample 7 | 11.55 | 13 | 49 | 460 | 180 |
| Sample 8 | 10.40 | 26 | 55 | 460 | 180 |
| Sample 9 | 11.08 | 29 | 51 | 460 | 180 |
| Sample 10 | 11.10 | 15 | 48 | 490 | 300 |
| Sample 11 | 11.40 | 13 | 50 | 460 | 180 |
| Sample 12 | 11.80 | 8 | 43 | 490 | 300 |
| Sample 13 | 12.05 | 7 | 45 | 460 | 180 |

TABLE 4

| | Volume resistivity log $\rho$ ($\Omega$cm) | Resistance to coloring by electron rays $\Delta T$ (%) | Mechanical strength $Kg/mm^2$ | Ion exchange treatment Temp. (°C.) | Time (min) |
|---|---|---|---|---|---|
| Comparative Example 1 | 12.40 | 45 | 11 | 460 | 180 |
| Comparative Example 2 | 12.50 | 48 | 10 | 460 | 180 |
| Comparative Example 3 | 10.70 | 40 | 14 | 460 | 180 |
| Comparative Example 4 | 11.80 | 50 | 15 | 460 | 180 |
| Comparative Example 5 | 8.50 | 41 | 40 | 460 | 180 |

EXAMPLE 2

A glass plate of 5 mm in thickness was produced in the same manner as sample 1, using a glass having a composition shown in the sample 6 column of Table 1. The glass plate was treated under the conditions for ion exchange treatment shown in Table 5 and then measured for resistance to coloring by electron rays ($\Delta T$) and mechanical strengths [maximum stress (kg/mm$^2$) and depth of stress ($\mu$m)]. The results are shown in Table 5. The maximum stress and depth of stress were measured according to the following methods.

The maximum stress was determined by grinding a glass plate to a thickness of 2-3 mm and measuring the optical pass difference of the plate by the retardation method. The depth of stress was determined by measuring the positions from glass surface, of the interference fringes appearing in the same method.

TABLE 5

| Ion exchange treatment | | Resistance to coloring by electron rays $\Delta T$ (%) | Mechanical strength | |
|---|---|---|---|---|
| Temp. (°C.) | Time (min) | | Maximum stress (Kg/mm$^2$) | Depth of stress ($\mu$m) |
| 460 | 150 | 10 | 45 | 6.0 |
| 460 | 360 | 15 | 62 | 8.6 |
| 490 | 90 | 13 | 64 | 7.7 |
| 490 | 120 | 14 | 56 | 8.0 |
| 490 | 300 | 14 | 47 | 8.5 |
| 500 | 90 | 14 | 53 | 8.6 |
| 500 | 120 | 15 | 48 | 9.0 |

EXAMPLE 3

Two glass plates of 10 mm and 15 mm in thickness, each having a composition shown in the sample 6 column of Table 1 were produced by the float process of shaping a molten glass material into a glass plate on a molten tin bath. Using the two glass plates, front glass panels having dimensions shown in the sample A to D columns of Table 6 were produced by a known heat-bending shaping method using a male die and a female die. Each of these glass panels was subjected to an ion exchange treatment (ion exchange between K ion in molten potassium nitrate and Na ion in glass) in molten potassium nitrate under the temperature and time shown in Table 6, to form a layer for prevention of coloring by electron rays and a compression stress in the vicinity of the glass surface. The thus obtained samples A to D were irradiated, at the image display regions, with electron rays of 40 $\mu$A/cm$^2$ accelerated by 10 KV, for 100 hours, and then measured for the resulting reduction in transmittance of 400 nm light. The results are shown in Table 6.

TABLE 6

| | Dimension of glass panel | | | Ion exchange treatment | | Resistance to coloring by electron rays $\Delta T$ (%) |
|---|---|---|---|---|---|---|
| | Glass thickness (mm) | Length of short side (mm) | Length of long side (mm) | Depth (mm) | Temp. (°C.) | Time (min) | |
| Sample A | 10 | 240 | 310 | 30 | 460 | 180 | 13 |
| Sample B | 10 | 220 | 360 | 30 | 490 | 90 | 13 |
| Sample C | 15 | 370 | 490 | 30 | 460 | 180 | 13 |
| Sample D | 15 | 340 | 570 | 30 | 500 | 120 | 15 |

EXAMPLE 4

Two glass plates each of 5 mm in thickness were produced from the glass having a composition shown in the sample 6 column of Table 1, in the same manner as sample 1. One of the glass plates was subjected to an ion exchange treatment at 460° C. for 180 minutes to obtain a sample X. The other glass plate was subjected to an ion exchange treatment at 460° C. for 360 minutes to obtain a sample Y. The samples X and Y were measured for mole % of Na$_2$O/(Na$_2$O+K$_2$O) at various depths (0 to 7 $\mu$m) from the plate surface, using an X-ray microanalyzer. The results are shown in Table 7.

The samples X and Y were irradiated with electron rays of 40 $\mu$A/cm$^2$ accelerated by 10 KV, in vacuum for 100 hours, and then measured for reduction in transmittance of 400 nm light, i.e. $\Delta T$. The $\Delta T$ was 23% in the sample X and 30% in the sample Y. The glass before ion exchange treatment gave a $\Delta T$ of 60%.

TABLE 7

Mole % of Na$_2$O/(Na$_2$O + K$_2$O) at various depths

| | Mole % | |
|---|---|---|
| Depth ($\mu$m) | 460° C. × 180 minutes | 460° C. × 360 minutes |
| 0 | 0.17 | 0.19 |
| 0.1 | 0.21 | 0.19 |
| 0.3 | 0.23 | 0.2 |
| 0.5 | 0.30 | 0.25 |
| 1 | 0.34 | 0.31 |
| 2 | 0.44 | 0.4 |
| 3 | 0.56 | 0.51 |
| 4 | 0.68 | 0.62 |
| 5 | 0.78 | 0.66 |
| 6 | 0.83 | 0.68 |
| 7 | 0.85 | 0.76 |

As is appreciated from the above Examples, the glass panel of the present invention has, as an electrical insulating property, a volume resistivity larger than 1×10$^{10}$ $\Omega$cm which is a yardstick which indicates no dielectric breakdown; it has a high mechanical strength of at least 40 kg/mm$^2$; and it gives a low reduction in transmittance when irradiated with electron rays. As compared with the glass panels of the prior art, the present glass panel is improved in the compression stress (the compression stress can be used as a yardstick for mechanical strength) and resistance to coloring by electron rays, of the surface layer.

The glass panel of the present invention has, at the surface, a compression stress layer capable of suppressing the appearance of coloring by irradiation with electron rays; therefore, when used in image display devices wherein irradiation with electron rays takes place, the present glass panel can emit a transmitted light efficiently. Further, being strong to the mechanical impact applied from outside, the glass panel can be made with a small glass thickness, making it possible to provide a lightweight image display device. Furthermore, the glass panel of the present invention has a large volume resistivity and therefore is resistant to dielectric breakdown even when a high voltage is applied thereto. Moreover, the glass plate material from which the glass panel of the present invention is to be shaped, can be produced directly from a molten glass material by the float process and therefore can be obtained inexpensively in a large amount

We claim:

1. A glass panel resistant to coloring when irradiated with electron rays, which has an electrical resistivity of at least 1×10$^{10}$ ohm-cm and consist essentially of the following glass composition:

| | |
|---|---|
| SiO$_2$ | 64–75% by weight |
| Al$_2$O$_3$ | 1.5–2.0% by weight |
| CaO | 6.5–9.0% by weight |
| MgO | 0–5.0% by weight |
| Li$_2$O | 0.5–2.5% by weight |
| Na$_2$O | 7.0–12% by weight |
| K$_2$O | 2.1–5.0% by weight |
| SrO + BaO + ZrO$_2$ | 0–10% by weight |
| CeO$_2$ | 0–0.5% by weight, | wherein part of the Na ion, in at least the surface layer of the panel region to be irradiated with electron rays, is substituted with K ion by an ion exchange treatment in a K-containing molten salt so that the molar ratio of Na ion and K ion expressed by Na$_2$O/(Na$_2$O+K$_2$O), in at least the glass layer ranging from 0.5 $\mu$m to 6.5 $\mu$m in depth from the panel surface of said panel region to be irradiated with electron rays, is 0.3–0.75.

2. A glass panel resistant to coloring when irradiated with electron rays, which has an electrical resistivity of at least 1×10$^{10}$ ohm-cm and consists essentially of the following glass composition:

| | |
|---|---|
| SiO$_2$ | 64–75% by weight |
| Al$_2$O$_3$ | 1.5–2.0% by weight |
| CaO | 6.5–9.0% by weight |
| MgO | 0–5.0% by weight |
| Li$_2$O | 0.5–2.5% by weight |
| Na$_2$O | 7.0–12% by weight |
| K$_2$O | 2.1–5.0% by weight |

-continued

| | |
|---|---|
| SrO + BaO + ZrO$_2$ | 0–10% by weight |
| CeO$_2$ | 0–0.5% by weight, | wherein part of the Na ion, in at least the surface layer of the panel region to be irradiated with electron rays, is substituted with K ion by an ion exchange treatment in a K-containing molten salt so that the molar ratio of Na ion and K ion expressed by Na$_2$O/(Na$_2$O+K$_2$O), in at least the glass layer ranging from 0.5 μm to 1.5 μm in depth from the panel surface of said panel region to be irradiated with electron rays, is 0.3–0.75.

3. A glass panel resistant to coloring when irradiated with electron rays, which has an electrical resistivity of at least 1×10$^{10}$ ohm-cm and consists essentially of the following glass composition:

| | |
|---|---|
| SiO$_2$ | 64–75% by weight |
| Al$_2$O$_3$ | 1.5–2.0% by weight |
| CaO | 6.5–9.0% by weight |
| MgO | 0–5.0% by weight |
| Li$_2$O | 0.5–2.5% by weight |
| Na$_2$O | 7.0–12% by weight |
| K$_2$O | 2.1–5.0% by weight |
| SrO + BaO + ZrO$_2$ | 0–10% by weight |
| CeO$_2$ | 0–0.5% by weight, | wherein in part of the Na ion, in at least the surface layer of the panel region to be irradiated with electron rays, is substituted with K ion by an ion exchange treatment in a K-containing molten salt so that the molar ratio of Na ion and K ion expressed by Na$_2$O/(Na$_2$O+K$_2$O), in at least the glass layer ranging from 1.5 μm to 3.5 μm in depth from the panel surface of said panel region to be irradiated with electron rays, is 0.3–0.75.

4. A glass panel resistant to coloring when irradiated with electron rays, which has an electrical resistivity of at least 1×10$^{10}$ ohm-cm and consists essentially of the following glass composition:

| | |
|---|---|
| SiO$_2$ | 64–75% by weight |
| Al$_2$O$_3$ | 1.5–2.0% by weight |
| CaO | 6.5–9.0% by weight |
| MgO | 0–5.0% by weight |
| Li$_2$O | 0.5–2.5% by weight |
| Na$_2$O | 7.0–12% by weight |
| K$_2$O | 2.1–5.0% by weight |
| SrO + BaO + ZrO$_2$ | 0–10% by weight |
| CeO$_2$ | 0–0.5% by weight, | wherein part of the Na ion, in at least the surface layer of the panel region to be irradiated with electron rays, is substituted with K ion by an ion exchange treatment in a K-containing molten salt so that the molar ratio of Na ion and K ion expressed by Na$_2$O/(Na$_2$O+K$_2$O), in at least the glass layer ranging from 1.5 μm to 6.5 μm in depth from the panel surface of said panel region to be irradiated with electron rays, is 0.3–0.75.

5. The glass panel set forth in claim 1, wherein the glass composition is:

| | |
|---|---|
| SiO$_2$ | 64–72% by weight |
| Al$_2$O$_3$ | 1.5–2.0% by weight |
| CaO | 6.5–9.0% by weight |
| MgO | 3.0–4.0% by weight |
| Li$_2$O | 0.5–1.5% by weight |
| Na$_2$O | 8.5–10.5% by weight |
| K$_2$O | 2.1–3.0% by weight |
| SrO + BaO + ZrO$_2$ | 4.5–10.0% by weight |

6. The glass panel set forth in claim 2, wherein the glass composition is:

| | |
|---|---|
| SiO$_2$ | 64–72% by weight |
| Al$_2$O$_3$ | 1.5–2.0% by weight |
| CaO | 6.5–9.0% by weight |
| MgO | 3.0–4.0% by weight |
| Li$_2$O | 0.5–1.5% by weight |
| Na$_2$O | 8.5–10.5% by weight |
| K$_2$O | 2.1–3.0% by weight |
| SrO + BaO + ZrO$_2$ | 4.5–10.0% by weight |

7. The glass panel set forth in claim 3, wherein the glass composition is:

| | |
|---|---|
| SiO$_2$ | 64–72% by weight |
| Al$_2$O$_3$ | 1.5–2.0% by weight |
| CaO | 6.5–9.0% by weight |
| MgO | 3.0–4.0% by weight |
| Li$_2$O | 0.5–1.5% by weight |
| Na$_2$O | 8.5–10.5% by weight |
| K$_2$O | 2.1–3.0% by weight |
| SrO + BaO + ZrO$_2$ | 4.5–10.0% by weight |

8. The glass panel set forth in claim 4, wherein the glass composition is:

| | |
|---|---|
| SiO$_2$ | 64–72% by weight |
| Al$_2$O$_3$ | 1.5–2.0% by weight |
| CaO | 6.5–9.0% by weight |
| MgO | 3.0–4.0% by weight |
| Li$_2$O | 0.5–1.5% by weight |
| Na$_2$O | 8.5–10.5% by weight |
| K$_2$O | 2.1–3.0% by weight |
| SrO + BaO + ZrO$_2$ | 4.5–10.0% by weight. |

9. The glass panel set forth in claim 1, where the reduction (ΔT) in transmittance of the panel after irradiation with electron rays as compared with before irradiation is smaller than 40% when the panel is irradiated with electron rays of 10 KV and 40 μA/cm$^2$ for 100 hours in vacuum and the transmittance after and before irradiation are measured using a light of 400 nm wavelength.

10. The glass panel set forth in claim 1, having a thickness of 4–25 mm.

11. The glass panel set forth in claim 2, having a thickness of 4–7 mm.

12. The glass panel set forth in claim 3, having a thickness of 14–18 mm.

13. The glass panel set forth in claim 4, having a thickness of 19–23 mm.

14. A glass panel resistant to coloring when irradiated with electron rays, which has an electrical resistivity of at least 1×10$^{10}$ ohm-cm and consists essentially of the following glass composition:

| | |
|---|---|
| SiO$_2$ | 64–75% by weight |
| Al$_2$O$_3$ | 1.5–2.0% by weight |
| CaO | 6.5–9.0% by weight |
| MgO | 0–5.0% by weight |
| Li$_2$O | 0.5–2.5% by weight |
| Na$_2$O | 7.0–12% by weight |
| K$_2$O | 2.1–5.0% by weight |
| SrO + BaO + ZrO$_2$ | 0–10% by weight |

-continued

| | |
|---|---|
| CeO$_2$ | 0-0.5% by weight, | wherein part of the Na ion, in at least the surface layer of the panel region to be irradiated with electron rays, is substituted with K ion by an ion exchange treatment in a K-containing molten salt, and wherein reduction ($\Delta T$) in transmittance of the panel after irradiation with electron rays as compared with before irradiation is smaller than 40% when the panel is irradiated with electron rays of 10 KV and 40 $\mu$A/cm$^2$ for 100 hours in vacuum and the transmittance after and before irradiation are measured using a light of 400 nm wavelength.

15. The glass panel set forth in claim 14, wherein the glass composition is:

| | |
|---|---|
| SiO$_2$ | 64-72% by weight |
| Al$_2$O$_3$ | 1.5-2.0% by weight |
| CaO | 6.5-9.0% by weight |
| MgO | 3.0-4.0% by weight |
| Li$_2$O | 0.5-1.5% by weight |
| Na$_2$O | 8.5-10.5% by weight |
| K$_2$O | 2.1-3.0% by weight |
| SrO + BaO + ZrO$_2$ | 4.5-10.0% by weight. |

16. The glass panel set forth in claim 14, wherein the reduction ($\Delta T$) in transmittance is smaller than 20%.

17. A glass plate for use in a device which is irradiated with electron rays, which has an electrical resistivity of at least $1 \times 10^{10}$ ohm-cm and consists essentially of the following glass composition:

| | |
|---|---|
| SiO$_2$ | 64-75% by weight |
| Al$_2$O$_3$ | 1.5-2.0% by weight |
| CaO | 6.5-9.0% by weight |
| MgO | 0-5.0% by weight |
| Li$_2$O | 0.5-2.5% by weight |
| Na$_2$O | 7.0-12% by weight |
| K$_2$O | 2.1-5.0% by weight |
| SrO + BaO + ZrO$_2$ | 0-10% by weight |
| CeO$_2$ | 0-0.5% by weight. |

18. The glass plate set forth in claim 17, wherein the glass composition is:

| | |
|---|---|
| SiO$_2$ | 64-72% by weight |
| Al$_2$O$_3$ | 1.5-2.0% by weight |
| CaO | 6.5-9.0% by weight |
| MgO | 3.0-4.0% by weight |
| Li$_2$O | 0.5-1.5% by weight |
| Na$_2$O | 8.5-10.5% by weight |
| K$_2$O | 2.1-3.0% by weight |
| SrO + BaO + ZrO$_2$ | 4.5-10.0% by weight. |

* * * * *